United States Patent
Cederholm et al.

(10) Patent No.: US 10,193,618 B2
(45) Date of Patent: Jan. 29, 2019

(54) LOOPBACK TESTING IN FREQUENCY DIVISION DUPLEX SYSTEMS

(71) Applicant: Telefonaktiebolaget LM Ericsson (publ), Stockholm (SE)

(72) Inventors: Daniel Cederholm, Sollentuna (SE); Elmar Trojer, Täby (SE); Miguel Berg, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/553,991

(22) PCT Filed: Mar. 2, 2015

(86) PCT No.: PCT/SE2015/050236
§ 371 (c)(1),
(2) Date: Aug. 26, 2017

(87) PCT Pub. No.: WO2016/140600
PCT Pub. Date: Sep. 9, 2016

(65) Prior Publication Data
US 2018/0054254 A1  Feb. 22, 2018

(51) Int. Cl.
*H04B 10/071* (2013.01)
*H04B 3/46* (2015.01)
(Continued)

(52) U.S. Cl.
CPC ............ *H04B 10/071* (2013.01); *H04B 3/46* (2013.01); *H04M 1/24* (2013.01); *H04M 3/30* (2013.01); *H04L 43/50* (2013.01)

(58) Field of Classification Search
CPC ........ H04B 10/071; H04B 3/46; H04B 3/487; H04M 3/30; H04M 1/24; H04M 11/062; H04M 3/28; H04M 3/306; H04L 43/50
See application file for complete search history.

(56) References Cited

U.S. PATENT DOCUMENTS 5,875,245 A * 2/1999 Miyasita ................ H04M 3/30
340/660
6,570,394 B1 * 5/2003 Williams ................ H04B 3/46
324/620
(Continued)

FOREIGN PATENT DOCUMENTS

EP   2809014 A1   12/2014
EP   3035063 A1   6/2016
(Continued)

OTHER PUBLICATIONS

Espacenet English translation of EP 2809014.*
(Continued)

*Primary Examiner* — Mohamed K Amara
(74) *Attorney, Agent, or Firm* — Sage Patent Group (57) ABSTRACT

A communication device and method therein for loopback testing. The device comprises a transmitter and a receiver and applies FDD for communication over one or more lines. The method comprises degrading a linearity of the transmitter, as compared to the linearity during normal operation. The method further comprises transmitting at least one test signal in a transmit frequency band, such that at least one signal is created in a receive frequency band, wherein the created at least one signal is a distortion product of the at least one test signal; and further, receiving a response to the at least one created signal in the receive frequency band.

14 Claims, 5 Drawing Sheets

(51) Int. Cl.
*H04M 1/24* (2006.01)
*H04M 3/30* (2006.01)
*H04L 12/26* (2006.01)

(56) References Cited

U.S. PATENT DOCUMENTS

| | | | |
|---|---|---|---|
| 6,963,641 B1* | 11/2005 | Capon | H04M 11/062 379/398 |
| 9,927,517 B1* | 3/2018 | Bennett | G01S 13/04 |
| 2003/0231888 A1* | 12/2003 | Takashina | H04B 10/071 398/149 |
| 2007/0127919 A1* | 6/2007 | Kallstenius | H04B 10/071 398/25 |
| 2012/0219123 A1* | 8/2012 | Berg | H04B 3/487 379/27.01 |
| 2013/0170629 A1* | 7/2013 | Flowers | H04M 3/306 379/23 |
| 2014/0212131 A1* | 7/2014 | Zhang | H04B 10/0771 398/16 |

FOREIGN PATENT DOCUMENTS

| | | |
|---|---|---|
| WO | 2011053207 A1 | 5/2011 |
| WO | 2013102497 A1 | 7/2013 |

OTHER PUBLICATIONS

—"operational Amplifiers" by Chaniotakis et al. (2006) from https://ocw.mit.edu/courses/electrical-engineering-and-computer-science/6-071j-introduction-to-electronics-signals-and-measurement-spring-2006/lecture-notes/22_op_amps1.pdf.*
International Search Report and Written Opinion for Application No. PCT/SE2015/050236, dated Aug. 31, 2015, 9 pages.
Office Action for European Application No. 15710961.2. dated Jul. 9, 2018, 5 pages.

* cited by examiner

LOOPBACK TESTING IN FREQUENCY DIVISION DUPLEX SYSTEMS

CROSS-REFERENCE TO RELATED APPLICATIONS

This application is a National stage of International Application No. PCT/SE2015/050236, filed Mar. 2, 2015, which is hereby incorporated by reference.

TECHNICAL FIELD

The embodiments of the present invention generally relate to loopback testing of communications links, and in particular to loopback testing in Frequency Division Duplex (FDD) systems, which typically use filters to separate transmit and receive signals.

BACKGROUND

A built-in line testing mechanism is desired in many communications systems, since it allows the link to be tested remotely without sending service personnel to the site. Such mechanisms are often available in e.g. Ethernet transceivers and xDSL transceivers. For example, single- and double-ended line testing measurements and post-processing for xDSL are described in the ITU-T standard G.996.2, Single-Ended Line Testing (SELT).

Single-Ended Line Testing (SELT) is a useful tool for troubleshooting non-working communication links or links with degraded performance and for locating cable faults. SELT is also useful for e.g. cable installation verification and performance estimation/prediction. For full-duplex, echo-cancelled systems like 1000BASE-T and 10GBASE-T, it is possible to transmit and receive at the same time and at the same frequency. This enables both echo and transfer function measurements. However, for communication systems applying FDD, it is in general not possible to transmit and receive at the same frequency unless some switching mechanism is added in order to bypass either the transmit or receive filters or both. If switching needs to be performed in analog domain, which is typically the case when analog duplex filters are involved, the switches add cost and complexity and may also decrease system performance since communication signals must pass through the switches during normal operation.

SUMMARY

It is desired to provide loopback testing functionality in FDD line communication equipment. This is achieved by the solution disclosed herein, where distortion products, i.e. intermodulation and/or harmonics, of one or more transmitted test signals are utilized in order to provide signals in an FDD receive band. Such distortion products are highly undesired during normal operation of a communication system, but could be achieved e.g. by increasing gain of a line driver amplifier outside the region of normal operation.

If signals with frequencies $f_1$ and $f_2$ are generated in the transmit band and subjected to non-linear distortion, preferably after transmit filtering, intermodulation products will be generated, having frequencies $f_{im}=mf_1+nf_2$ where m and n are integers and $O_{im}=|m|+|n|$ is the intermodulation order.

The solution disclosed herein enables testing of an FDD system or interface without the need for additional switching circuitry to bypass transmit and/or receive filters. This allows testing of existing equipment that was not designed with bypass functionality. It also obviates the need for the transmitter to be operable to produce test signals, i.e. other than distortion products, in the receive frequency band.

Finally, the herein suggested solution may also be attractive for new designs, since adding switching circuitry will both increase cost and decrease reliability of the equipment.

According to a first aspect, a method is provided for loopback testing, which is to be performed by a device in a communication system. The device comprises a transmitter and a receiver and applies FDD for communication over one or more lines. The method comprises degrading a linearity of the transmitter as compared to the linearity during normal operation. The method further comprises transmitting at least one test signal in a transmit frequency band, such that at least one signal is created in a receive frequency band, wherein the created at least one signal is a distortion product of the at least one test signal; and further, receiving a response to the at least one created signal in the receive frequency band.

According to a second aspect, a communication device is provided for loopback testing. The communication device is operable in a communication system, and comprises a transmitter and a receiver. The communication device is configured to apply FDD for communication, and is further configured to, for loopback testing: degrade a linearity of the transmitter as compared to the linearity during normal operation; transmit at least one test signal in a transmit frequency band, such that at least one signal is created in the receive frequency band, wherein the at least one created signal is a distortion product of the at least one test signal; and to receive a response to the at least one created signal in the receive frequency band.

According to a third aspect, a computer program is provided, which comprises instructions which, when executed on at least one processor, cause the at least one processor to carry out the method according to the first aspect.

According to a fourth aspect, a carrier is provided, which contains the computer program of the third aspect.

BRIEF DESCRIPTION OF DRAWINGS

The foregoing and other objects, features, and advantages of the technology disclosed herein will be apparent from the following more particular description of embodiments as illustrated in the accompanying drawings. The drawings are not necessarily to scale, emphasis instead being placed upon illustrating the principles of the technology disclosed herein.

DETAILED DESCRIPTION

As previously described, built-in line testing is highly desired in line communication systems, especially loopback tests, such as Time Domain Reflectometry (TDR), or Frequency Domain Reflectometry (FDR). SELT is an example of a loopback test, which may be performed e.g. by TDR or FDR. A loopback test is performed from one end of a communication link, and does not require involvement, in the measurement per se, of a remote communication unit, even though involvement of such a remote unit is not excluded. Some loopback tests may be performed without any involvement of a remote communication unit. Examples of remote units are e.g. a Customer Premises Equipment (CPE) or a Radio Head (RH). Herein, the term "loopback test" is used as covering all sorts of echo tests, reflectometry tests and near end crosstalk (NEXT) tests that may be performed from one end of a communication link.

Figure 3:
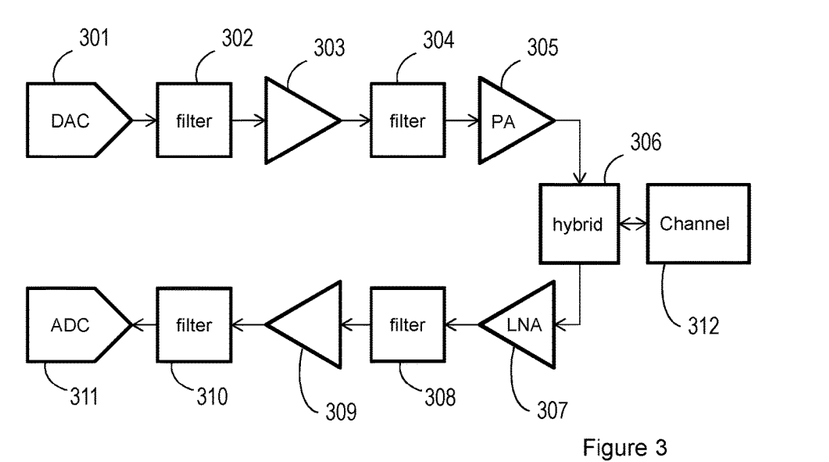
FIG. 3 is a schematic block chart showing an example of an FDD system where embodiments of the invention can be applied.

In a line communication system applying FDD, separate frequency bands are used for transmission and reception. In such FDD communication systems, filters are typically used in the transmit and receive chains, which are configured for the frequency band of the chain in which they are located. FIG. 3 shows an example of an FDD system comprising a transmitter chain 301-305, and a receiver chain 307-311. The chains may alternatively be denoted e.g. transmit and receive branches. In the illustrated FDD system, a so-called hybrid circuit 306 is used to separate the transmit and receive chains and frequency bands. The filters 302, 304, 308 and 310 are needed in the transmit and receive chains since the transmit-receive isolation of a hybrid circuit is limited. Filtering is also needed e.g. to suppress image frequencies from the digital to analog converter (DAC) 301 and to prevent aliasing in the analog to digital converter (ADC) 311.

The problem of introducing a loopback test in an FDD system will now be described in more detail. In order to perform a loopback test in an FDD system, test signals need to be transmitted in the receive frequency band, in order for the receiver to be able to receive a response, such as an echo, to the test signal. Alternatively, a response to a test signal needs to be received in the transmit frequency band. Even if signals in the receive frequency band could be provided as output from the DAC, or if signals in the transmit frequency band could be received as input by the ADC, the filters in the respective chains would cause problems, which would need to be solved. In order for a test signal in the receive frequency band to be able to propagate through the transmit chain, the filters in the transmitter chain need to be bypassed, e.g. short circuited, since these filters are designed to suppress signals in the receive frequency band. Correspondingly, in order for a signal in the transmit frequency band to be able to propagate through the receive chain, the filters in the receive chain need to be bypassed. This could be done by adding switching circuitry providing a bypass for the signal when appropriate. However, additional circuitry adds cost and complexity.

The solution described herein enables loopback testing of an FDD line communication system or interface, as the one illustrated in FIG. 3, without the need for switching circuitry to bypass filters. Thus, the solution allows testing of existing equipment that was not designed with bypass functionality. Further, the solution does not require that the part of the transmitter generating signals during regular operation changes frequency to the receive band.

The inventors have realized that a property of one or more amplifiers in the transmitter chain, which (property) would normally be strictly undesired, could be exploited in order to generate test signals in the receive frequency band. This property is non-linearity which leads to generation of distortion products in form of harmonics or intermodulation products. Below, the characteristics of distortion products will be described in more detail. The examples given below will be related to intermodulation products, generated by two or more test signals. However, the solution is also applicable for use of a single test signal and harmonic distortion products.

Intermodulation

Assuming that sufficient non-linearity can be generated, e.g. by increasing gain or by lowering supply voltage or bias to one or more of the transmit amplifiers, several orders of intermodulation products will be generated.

Selection of Test Signals

As an example, second order intermodulation (IM2) with frequencies $2f_1$, $2f_2$, $f_1-f_2$, $f_1+f_2$ may be generated (or $2f_2$, $2f_1$, $f_2-f_1$, $f_2+f_1$). Third order IM (IM3) may also be generated, having frequencies $3f_1$, $3f_2$, $2f_1-f_2$, $2f_1+f_2$, $2f_2+f_1$, and $2f_2-f_1$ (or $3f_2$, $3f_1$, $f_2-2f_1$, $2f_1+f_2$, $2f_2+f_1$, and $f_1-2f_2$). Higher order IM may also be generated but may have lower magnitude than lower order IM. Also, higher order IM could be spread more in frequency, resulting in a more coarse frequency grid with larger gaps compared with lower order IM. By careful selection of the transmitted signals, it may be possible to reach all desired frequencies within the receive band.

Figure 1:
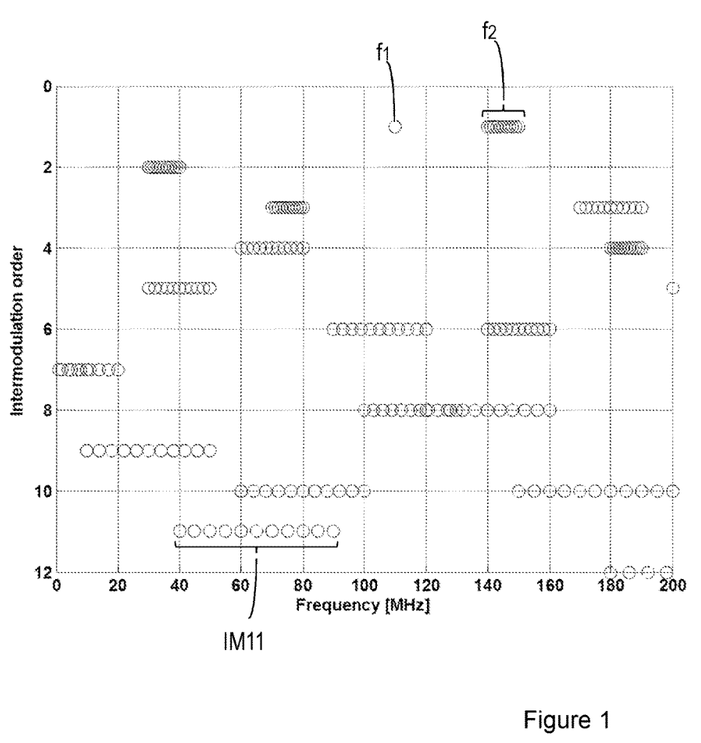
FIG. 1 is a diagram showing an example of intermodulation products up to order 12 when transmitting a 110 MHz sine wave together with a sine wave swept in the range 140-150 MHz.

An example is shown in FIG. 1 where $f_1$=110 MHz and $f_2$ is varied in 1 MHz steps between 140 and 150 MHz. The fundamental frequencies (order=1) and the resulting intermodulation frequencies and their order are shown in the range 0-200 MHz (x-axis). If differential, i.e. balanced, amplifiers are used, even (non-odd) order intermodulation products may have very low magnitude and will thus be less desirable for the solution disclosed herein. Assuming that we want to perform a measurement in the whole 40-80 MHz range, we would here need intermodulation products up to IM11 to avoid gaps.

Figure 2:
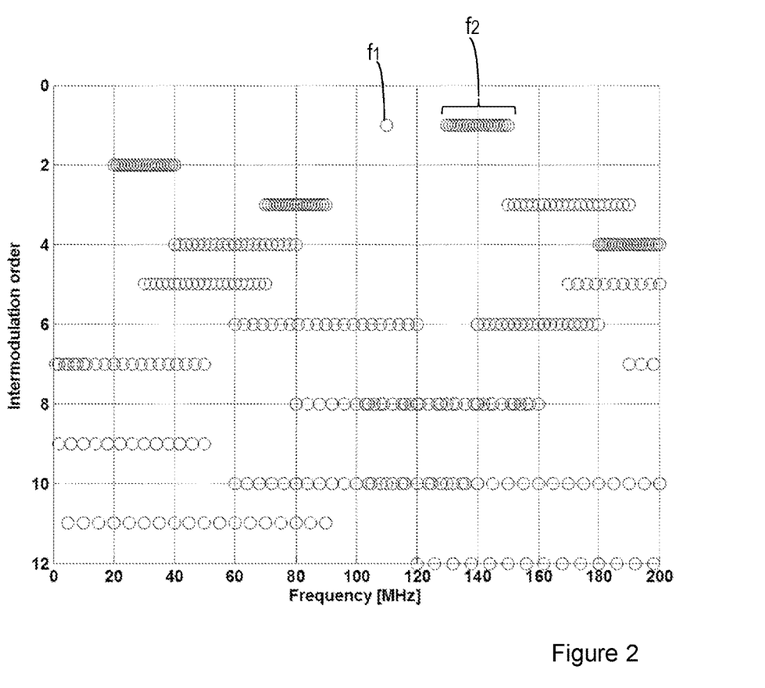
FIG. 2 is a diagram showing an example of intermodulation products up to order 12 when transmitting a 110 MHz sine wave together with a sine wave swept in the range 130-150 MHz.

If instead $f_2$ is varied in 1 MHz steps between 130 and 150 MHz, the whole 40-80 MHz range can be covered with IM3 and IM5, as shown in FIG. 2. This will typically result in stronger signal and thus better quality of the measurement, e.g. higher SNR, as compared with the previous case where the typically weak IM11 was needed. It can also be seen that IM4 covers the whole desired measurement range. If single-ended, i.e. unbalanced, amplifiers are used, IM4 could be stronger than IM5, and possibly also stronger than IM3, and may thus be preferred in some cases.

Instead of using only two frequencies, i.e. tones, at the same time, it would also be possible to transmit multiple tones at the same time. As an example, it would be possible to transmit $f_1$=110 MHz together with a multicarrier signal containing 1 MHz spaced tones between 130 and 150 MHz. This would give a result similar, but not identical, to that in FIG. 2. A difference would be that additional IM would be generated between the individual frequencies in the multicarrier, i.e. multi-frequency, signal.

The solution disclosed herein will work best when the non-linearity is applied after any filters that suppress transmit signals in the receive band. In the exemplifying communication arrangement illustrated in FIG. 3, intermodulation can be created at the output of the power amplifier 305 e.g. by increasing gain in the transmit signal chain sufficiently so that compression and/or clipping occurs in the power amplifier 305. The intermodulation products will propagate into the channel (e.g. a cable) and some of the energy will be reflected at impedance discontinuities.

For example, the test signals described above could be used in an exemplifying FDD system having a receive passband at 40-80 MHz and a transmit passband at 110-150 MHz. As previously stated, even if the ADC (cf. 311 in FIG. 3) could be modified to sample (receive) signals in the transmit band, those signals would be severely attenuated by the receive filters (cf. 308 and 310 in FIG. 3) since these are designed for the purpose of suppressing transmit signals. If instead the DAC (cf. 301 in FIG. 3) can be modified to produce a transmit signal in the receive band, the signal will be attenuated by the filters in the transmit chain. Although stop-band suppression is finite, i.e. the out-of-band signals will probably not be completely suppressed, the resulting measurement may have very low signal-to-noise ratio, leading to excessively long measurement times or even unusable measurements. Without the solution suggested herein, it would be necessary to add additional circuitry in order to be able to bypass filters during measurements.

With the proposed solution, signals for the receive band can be generated in the transmit chain after the transmit filters, i.e. as close to the channel as possible. This obviates the problems with stop band attenuation in transmit and receive filters.

The solution described herein has been tested in a lab environment and works well. Thermal noise and other uncorrelated noise sources can be mitigated by repeated measurements and proper averaging. There may also be some correlated noise than cannot be handled by averaging, e.g. intercarrier interference when a multicarrier signal is used as test signal.

EXEMPLIFYING EMBODIMENTS

Below, exemplifying embodiments performed by a communication device will be described with reference to FIG. 4. Further below, embodiments of a communication device will be described.

Figure 4:
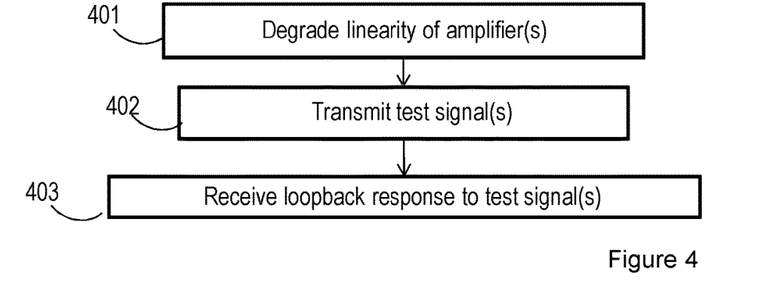
FIG. 4 is a flow chart showing a method performed by a communication device according to an exemplifying embodiment.

FIG. 4 shows a method for loopback testing, performed by a device in a communication system. The device comprises a transmitter and a receiver and applies FDD for communication over a communication link comprising one or more communication lines. The device could be e.g. a Radio Unit (RU), a Radio Head (RH), a Digital Subscriber Line Access Multiplexer (DSLAM) or a Customer Premises Equipment (CPE). At least part of the transmitter may be a transmitter chain comprising transmit filters, e.g. as the one illustrated in FIG. 3, and at least part of the receiver may be a receiver chain comprising receive filters, e.g. as the one illustrated in FIG. 3. The method comprises degrading 401 a linearity of the transmitter. By degrading is meant in relation to the linearity of the transmitter during normal operation, such as during communication over the one or more lines. The result of the degrading is a more non-linear transmitter than during normal operation. The degrading of the linearity may be regarded as entering into a test mode from a communication mode. Different ways to degrade the linearity of the transmitter will be described further below.

The method illustrated in FIG. 4 further comprises transmitting 402 at least one test signal in a transmit frequency band, such that at least one signal is created in a receive frequency band, wherein the created at least one signal is a distortion product of the at least one test signal. The method further comprises receiving 403 a response to, e.g. a reflection of, the at least one created signal in the receive frequency band. The receiving could alternatively be described as obtaining or capturing a response to the at least one created signal.

By selecting the at least one test signal in an appropriate manner, it is possible to predict which distortion products that will be created due to the non-linearity of the transmitter. An example of how to select test signals was described above when describing intermodulation products with reference to FIGS. 1 and 2. Since the transmit and receive frequency bands are known, one or more test signals could be selected in the transmit frequency band, which create harmonics and/or intermodulation products in the receive frequency band, as desired. When a single test signal is used, the at least one created signal, i.e. distortion product, will be an harmonic, and when more than one test signal is used, the created signals will be harmonics and intermodulation products. The result, as seen from the channel, will be the same as if the signals, of which some are distortion products, were transmitted from a transmitter operating in both frequency bands (transmit and receive).

The response received by the receiver may be a reflection, often denoted echo, in the line into which the one or more test signals are transmitted.

Alternatively, or in addition, crosstalk could be measured by transmitting a test signal according to the herein suggested solution on a first line, and then receiving a response on a second line. This response could be generalized to be near end crosstalk, NEXT. The transmitter and receiver of a communication device could comprise multiple transmit and receive chains.

The degrading of the linearity of the transmitter could comprise inducing one or more amplifiers of the transmitter to operate in a more non-linear region of their transfer function. Again, "more non-linear" should be read as more non-linear than during normal operation, such as communication. The inducing could be described as that the communication device is configured to operate one or more amplifiers in a more non-linear region during the loopback testing than during normal operation.

The linearity could be degraded e.g. by increasing a gain of one or more of the transmit chain amplifiers; by amplifying the at least one test signal to be provided to one or more amplifiers; by reducing a supply voltage of one or more amplifiers and/or by adjusting a bias of one or more amplifiers in the transmit chain. These different measures to affect the linearity of an amplifier may be derived from the measures normally taken for fighting non-linearity of amplifiers, but used "backwards" or reversely, i.e. for increasing the non-linearity instead of fighting it. When the communication device should return to communication mode, after the loopback testing has been performed, the linearity of the transmitter should be restored to a linearity which is more suitable for communication than the one used during the loopback testing. For example, the linearity of the transmitter could be restored to the same linearity as before the degrading described above.

The loopback test could be performed either based on Time Domain Reflectometry, TDR or Frequency Domain Reflectometry, FDR. The solution described herein is equally applicable in both cases.

One or more calibrations may be performed in association with the loopback test. Calibration could be performed by measurements on known impedances e.g. measurements on an open, a short, and matched load. Such calibration is well known to persons skilled in the art of network analyzer measurements. A preferred method of calibration for embodiments herein is to apply calibration based on measurements performed using a signal which is identical to the test signal, and then average the calibrated result. For example, one calibration per test signal or per set of test signals could be applied.

Experimental Results for Two Exemplifying Embodiments

Below, two test embodiments, denoted "embodiment 1" and "embodiment 2", will be outlined. These embodiments were used in an experimental setup, which will be described further below.

Embodiment 1

The first embodiment, or test procedure, used can be described as comprising the following steps:
1. Select a first test signal;
2. Degrade transmitter linearity and transmit test signal;
3. Capture response;
4. Optionally repeat from step 2 and average response;
5. Optionally, apply calibration to get calibrated result.

Calibration is needed if accurate phase information is needed for the echo measurement but may be omitted e.g. if only a coarse echo magnitude is of interest.

Embodiment 2

If better quality of the measurement is needed than what can be achieved with embodiment 1, the following embodiment of the invention can be used:
1. Select first test signal
2. Degrade transmitter linearity and transmit test signal;
3. Capture response
4. Optionally repeat from step 2 and average response;
5. Apply calibration, based on the test signal, to get calibrated result;
6. Select next test signal, repeat from step 2 and average calibrated result Here, calibration in step 5 is a must since the averaging in step 6 would otherwise corrupt the measurement.

In order to test the embodiments, a measurement was performed on a system similar to the one illustrated in FIG. 3, having a transmit passband of 110-150 MHz and a receive passband of 40-80 MHz. The test signal was a sine wave at 110 MHz together with a periodic multicarrier signal spanning 140-150 MHz and with random phase on each subcarrier. In embodiment 1, the phase of each subcarrier was constant during the whole measurement while in embodiment 2, the phase of each subcarrier was changed to another random value in step 6. The total measurement time was the same for both embodiments. No cable was attached to the channel port of the system and the channel port was open-circuit during the measurement.

Figure 5:
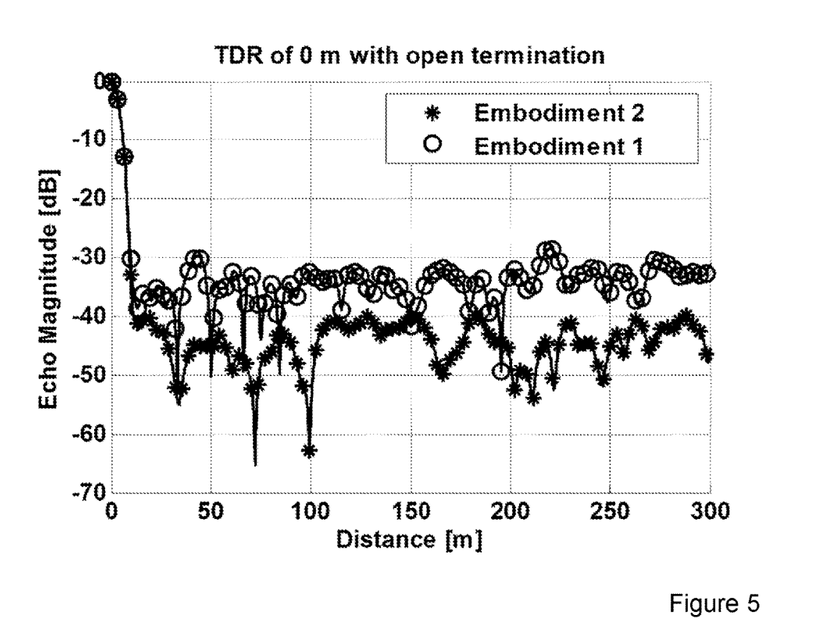
FIG. 5 is a diagram showing test results of a TDR comparison between embodiments for a measurement with no cable connected, i.e. zero meter, open-circuit.

After calibration and frequency domain windowing with a Kaiser window, an inverse FFT was applied to get a result similar to time-domain reflectometry (TDR) (the method described here is an example of a frequency domain reflectometry (FDR) method). Time was converted to distance using an assumption of the velocity of propagation of ⅔ the speed of light in vacuum. The result is shown in FIG. 5, where both embodiments show 0 meters with total reflection, i.e. 0 dB loss, as expected for this test case. It can be seen that embodiment 2 gives a substantially lower noise floor, i.e. echo magnitude at large distances, which will be useful when measuring long cables or cables where a partially matched load is attached on the far end of the cable.

The experiment verifies that the solution suggested herein works in practice. In the experiment, intermodulation was utilized in order to perform echo measurements in a system where transmit and receive frequencies do not overlap. Apart from creating the desired level of non-linearity in the transmitter, e.g. by increasing gain above normal operating conditions, the solution involves transmission of selected test signals. The test signals were selected such that low-order intermodulation products covered most of the desired measurement range.

Hardware Implementations

The methods and techniques described above may be implemented in communication devices, such as e.g. Radio Units (RUs), Radio Heads (RHs), Digital Subscriber Line Access Multiplexers (DSLAMs) or Customer Premises Equipment (CPE).

Figure 6A:
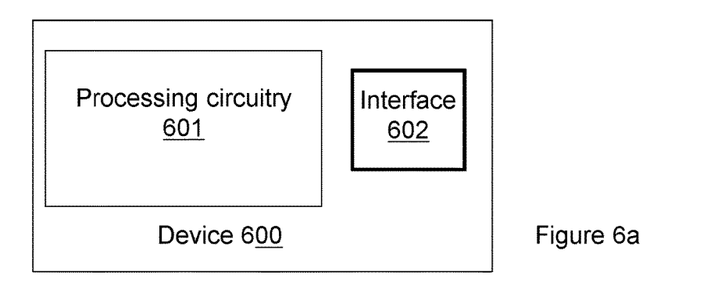
FIGS. 6a-c illustrate different implementations of communication devices according to exemplifying embodiments.
Figure 6B:
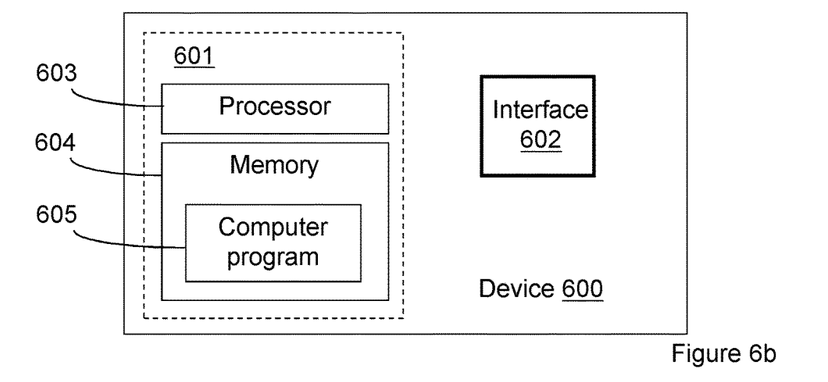
Figure 6C:
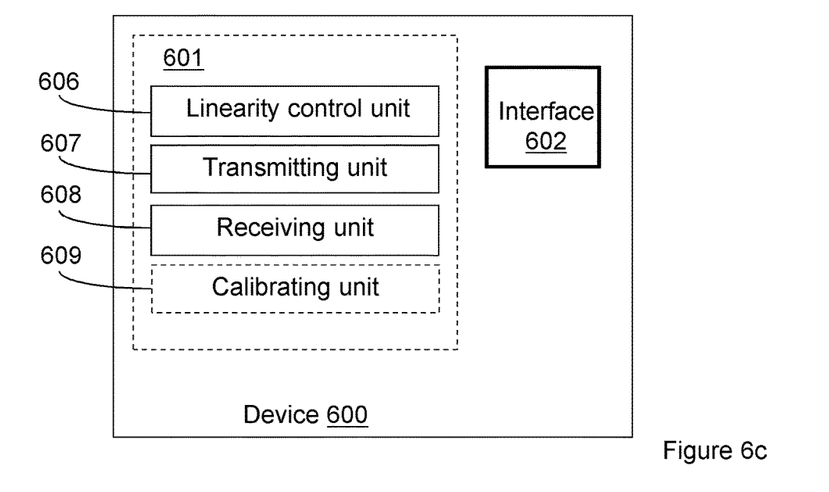

Communication Device, FIGS. 6a-6c

An exemplifying embodiment of a communication device is illustrated in a general manner in FIG. 6a. The communication device 600 is configured to perform at least one of the method embodiments described above e.g. with reference to FIG. 4. The communication device 600 is associated with the same technical features, objects and advantages as the previously described method embodiments. The communication device may be configured for being compliant with one or more standards for at least line communication. The communication device will be described in brief in order to avoid unnecessary repetition.

The communication device may be implemented and/or described as follows:

The communication device 600 is suitable for loopback testing and operable in a communication system. The device comprises a transmitter and a receiver and applies FDD for communication over at least one line. The receiver comprises at least one transmit chain which may comprise at least one transmit filter. The receiver comprises at least one receive chain, which may comprise at least one receive filter.

The communication device 600 comprises processing circuitry, or processing means 601 and a communication interface 602. The processing circuitry 601 is configured to cause the communication device 600 to degrading a linearity of the transmitter as compared to the linearity during normal operation. By "normal operation" is meant communication over the one or more lines. The processing circuitry 601 is further configured to cause the communication device to transmit at least one test signal in a transmit frequency band, such that at least one signal is created in a receive frequency band, wherein the created at least one signal is a distortion product of the at least one test signal. The processing circuitry 601 is further configured to cause the communication device to receive a response to the at least one created signal in the receive frequency band. The communication interface 602, which may also be denoted e.g. Input/Output (I/O) interface, includes an interface for sending data to and receiving data from other entities or modules.

The processing circuitry 601 could, as illustrated in FIG. 6b, comprise processing means, such as a processor 603, e.g. a CPU, and a memory 604 for storing or holding instructions. The memory would then comprise instructions, e.g. in form of a computer program 605, which when executed by the processing means 603 causes the communication device 600 to perform the actions described above e.g. with reference to FIG. 4.

An alternative implementation of the processing circuitry 601 is shown in FIG. 6c. The processing circuitry here comprises a linearity control unit 606, configured to cause the communication device 600 to degrade a linearity of the transmitter as compared to the linearity during normal operation. The processing circuitry further comprises a transmitting unit 607 configured to cause the communication device to transmitting at least one test signal in a transmit frequency band, such that at least one signal is created in a receive frequency band. The processing circuitry further comprises a receiving unit 608 configured to cause the communication device to receive a response to the at least one created signal in the receive frequency band. The processing circuitry 601 could comprise more units, such as a calibrating unit 609, when required for performing embodiments of the herein suggested solution. Such tasks could alternatively be performed by one of the other illustrated units.

The communication devices described above could be configured for the different method embodiments described herein, related e.g. to how to degrade the transmitter linearity and how to perform calibration.

The communication device 600 may be assumed to comprise further functionality, for carrying out regular communication device functions, e.g. associated with line communication.

Concluding Remarks

The steps, functions, procedures, modules, units and/or blocks described herein may be implemented in hardware using any conventional technology, such as discrete circuit or integrated circuit technology, including both general-purpose electronic circuitry and application-specific circuitry.

Particular examples include one or more suitably configured digital signal processors and other known electronic circuits, e.g. discrete logic gates interconnected to perform a specialized function, or Application Specific Integrated Circuits (ASICs).

Alternatively, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or a computer readable storage medium before and/or during the use of the computer program in the network nodes.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors, DSPs, one or more Central Processing Units, CPUs, and/or any suitable programmable logic circuitry such as one or more Field Programmable Gate Arrays, FPGAs, or one or more Programmable Logic Controllers, PLCs. That is, the units or modules in the arrangements in the different nodes described above could be implemented by a combination of analog and digital circuits, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

It should also be understood that it may be possible to re-use the general processing capabilities of any conventional device or unit in which the proposed technology is implemented. It may also be possible to re-use existing software, e.g. by reprogramming of the existing software or by adding new software components.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

When using the word "comprise" or "comprising" it shall be interpreted as non-limiting, i.e. meaning "consist at least of".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the technology disclosed herein, for it to be encompassed hereby.

In some instances herein, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof.

Additionally, it is intended that such equivalents include both currently known equivalents as well as equivalents developed in the future, e.g. any elements developed that perform the same function, regardless of structure.

ABBREVIATIONS

ADC Analog to Digital Converter
DAC Digital to Analog Converter
FDD Frequency Division Duplexing
FDR Frequency Domain Reflectometry
IM Intermodulation
SELT Single-Ended Line Test (FDR or TDR)
TDR Time Domain Reflectometry

The invention claimed is:

1. A method for loopback testing, performed by a device in a communication system, the device comprising a transmitter and a receiver and applying frequency division duplex (FDD) for communication, the method comprising:
   degrading a linearity of the transmitter as compared to the linearity of the transmitter during normal operation by inducing one or more amplifiers of the transmitter to operate in a more non-linear region of their transfer function;
   transmitting at least one test signal in a transmit frequency band, such that at least one signal is created in a receive frequency band, wherein the at least one created signal is a distortion product of the at least one test signal; and
   receiving a response to the at least one created signal in the receive frequency band for performing loopback testing irrespective of a requirement for one or more additional switching circuitry to bypass transmit or receive filters.

2. The method according to claim 1, wherein the degrading of the linearity of the transmitter comprises one or more of:
   increasing a gain of one or more amplifiers in a transmitting chain;
   amplifying the at least one test signal provided to one or more amplifiers in the transmitting chain;
   reducing a supply voltage of one or more amplifiers in the transmitting chain; and
   adjusting a bias of one or more amplifiers in the transmitting chain.

3. The method according to claim 1, being a Time Domain Reflectometry method or a Frequency Domain Reflectometry method.

4. The method according to claim 1, wherein the at least one created signal in the receive frequency band, being a distortion product, is a harmonic or an intermodulation product.

5. The method according to claim 1, further comprising:
   performing a calibration based on the at least one test signal.

6. A communication device for loopback testing, the communication device being operable in a communication system, and comprising a transmitter and a receiver and being configured to apply frequency division duplex (FDD) for communication, the communication device being further configured to:
   degrade a linearity of the transmitter as compared to the linearity of the transmitter during normal operation by inducing one or more amplifiers of the transmitter to operate in a more non-linear region of their transfer function;
   transmit at least one test signal in a transmit frequency band, such that at least one signal is created in a receive frequency band, wherein the at least one created signal is a distortion product of the at least one test signal; and
   receive a response to the at least one created signal in the receive frequency band for performing loopback testing irrespective of a requirement for one or more additional switching circuitry to bypass transmit or receive filters.

7. The communication device according to claim 6, being configured to degrade the linearity of the transmitter by one or more of:
   increasing a gain of one or more amplifiers in a transmitting chain;
   amplifying the at least one test signal provided to one or more amplifiers in the transmitting chain;
   reducing a supply voltage of one or more amplifiers in the transmitting chain; and
   adjusting a bias of one or more amplifiers in the transmitting chain.

8. The communication device according to claim 6, wherein the at least one created signal in the receive frequency band, being a distortion product, is a harmonic or an intermodulation product.

9. The communication device according to claim 6, being further configured to perform a calibration based on the at least one test signal.

10. A non-transitory computer readable storage medium comprising instructions which, when executed on at least one processor, cause a communication device comprising a transmitter and a receiver and applying frequency division duplex (FDD) for communication to perform loopback testing, comprising:
    degrading a linearity of the transmitter as compared to the linearity of the transmitter during normal operation by inducing one or more amplifiers of the transmitter to operate in a more non-linear region of their transfer function;
    transmitting at least one test signal in a transmit frequency band, such that at least one signal is created in a receive frequency band, wherein the at least one created signal is a distortion product of the at least one test signal; and
    receiving a response to the at least one created signal in the receive frequency band for performing loopback testing irrespective of a requirement for one or more additional switching circuitry to bypass transmit or receive filters.

11. The non-transitory computer-readable storage medium according to claim 10, wherein the instructions which, when executed on the at least one processor, further cause the degrading of the linearity of the transmitter by one or more of:
    increasing a gain of one or more amplifiers in a transmitting chain;
    amplifying the at least one test signal provided to one or more amplifiers in the transmitting chain;
    reducing a supply voltage of one or more amplifiers in the transmitting chain; and
    adjusting a bias of one or more amplifiers in the transmitting chain.

12. The non-transitory computer-readable storage medium according to claim 10, wherein the instructions which, when executed on the at least one processor, cause loopback testing to be performed by a Time Domain Reflectometry method or a Frequency Domain Reflectometry method.

13. The non-transitory computer-readable storage medium according to claim 10, wherein the instructions which, when executed on the at least one processor, further cause the at least one created signal in the receive frequency band, being a distortion product, to be a harmonic or an intermodulation product.

14. The non-transitory computer-readable storage medium according to claim 10, wherein the instructions which, when executed on the at least one processor, further cause the communication device to perform a calibration based on the at least one test signal.

\* \* \* \* \*